United States Patent [19]
Chowdhury et al.

[11] Patent Number: 6,026,439
[45] Date of Patent: Feb. 15, 2000

[54] FILE TRANSFERS USING PLAYLISTS

[75] Inventors: Shyamal Chowdhury, Austin; Carlos Enrique Ortiz, Round Rock, both of Tex.; Lance Warren Russell, Hollister, Calif.

[73] Assignee: International Business Machines Corporation, Armonk, N.Y.

[21] Appl. No.: 08/958,824

[22] Filed: Oct. 28, 1997

[51] Int. Cl.[7] ........................................ G06F 13/00
[52] U.S. Cl. ................................. 709/223; 709/304
[58] Field of Search ............................ 709/224, 232, 709/233, 236, 237, 238, 245, 246, 249, 304; 395/825, 684

[56] References Cited

U.S. PATENT DOCUMENTS

| | | | |
|---|---|---|---|
| 5,410,343 | 4/1995 | Coddington et al. | 348/7 |
| 5,539,449 | 7/1996 | Blahut et al. | 348/7 |
| 5,566,353 | 10/1996 | Cho et al. | 455/2 |
| 5,583,561 | 12/1996 | Baker et al. | 348/7 |
| 5,585,863 | 12/1996 | Hackett et al. | 348/716 |
| 5,594,490 | 1/1997 | Dawson et al. | 348/6 |
| 5,594,911 | 1/1997 | Cruz et al. | 395/800 |
| 5,600,573 | 2/1997 | Hendricks et al. | 364/514 |
| 5,650,941 | 7/1997 | Coelho et al. | 364/514 |
| 5,668,788 | 9/1997 | Allison | 369/30 |
| 5,805,173 | 9/1998 | Glennon et al. | 345/501 |
| 5,819,160 | 10/1998 | Foladare et al. | 455/45 |

*Primary Examiner*—Zarni Maung
*Attorney, Agent, or Firm*—Robert V. Wilder; Leslie A. Van Leeuwen

[57] ABSTRACT

A method and implementing apparatus is provided for transferring data from memory to a file decoder which is effective to decode the file for further processing. In an illustrated example, a video file is decoded for presentation on a display device. The methodology includes enabling a plurality of control functions for access by a user or a user system in controlling the identity, sequence and flow of file transfers in order to optimize transfer efficiency in a data transfer transaction. Application programming interface (API) calls are provided by which playlists are constructed for transfer to the decoder. Further API calls are provided to enable pause and seek functions to be activated during a file transfer. A registration methodology is also provided by which predetermined processing events may be selected and recorded as they occur. The process further includes a methodology for modifying the file transfer protocol between multiple copy transfer and minimal copy transfer depending upon the type of data transfer channel being implemented.

14 Claims, 5 Drawing Sheets

FILE TRANSFERS USING PLAYLISTS

RELATED APPLICATIONS

The present application is related to a co-pending application entitled "DATA TRANSFER COUPLING SUBSYSTEM", Ser. No. 08/958,823, filed on even date herewith and assigned to the assignee of the present application.

FIELD OF THE INVENTION

The present invention relates generally to information processing systems and more particularly to a method for transferring data to a file decoder.

BACKGROUND OF THE INVENTION

As computer network applications increase in number, the requirements for feature control in application processing are also increasing. The popularity and growth of multimedia computing in general, and especially in network multimedia computing, has increased the need to optimize information transfer capabilities, control and management. In computer-based multimedia applications, the use and availability of digitally coded files, including video and audio files, has greatly enhanced the usefulness of the system as well as the number of applications to which such multimedia computer systems can be applied. Typically, computer systems transfer files intact between devices. In video applications for example, where files are transferred from memory to a video decoder for presentation on a display device, there is generally no opportunity for a user to modify the files being transferred or otherwise control or manage the presentation of such files on a display device.

In many media applications, the presentations (both audio and video) can be greatly enhanced. Video presentations, for example, would be greatly enhanced when video files are presented in a predetermined order or sequence for maximum impact or even for logical presentation. Other applications may be enhanced by having a capability to pause a transfer transaction during the transfer process for example, in order to make several preliminary determinations concerning the user choices or the user's system, prior to the transfer and presentation of the entire file. That function would provide substantial benefit in cases where the entire video or audio file may contain an enormous amount of information and take considerable time to transfer the entire file from memory to a file decoder. If, for example in a video application, a user decides there is no need to view the entire file, or to switch to another file, system efficiency and system speed would be greatly increased by providing a user with the option to pause or terminate a video file transfer before the transfer has totally completed. Other desirable control features for use in transferring files include such capabilities as a jump function by which data being transferred would jump to a predetermined location of one file when another predetermined location of another file was being transferred, or to jump immediately to a certain location of a file when that file begins to transfer or reaches a certain location in the file.

Thus there is a need for an improved method and processing apparatus which is effective to provide an application programming interface to allow end users and end user systems data transfer control options in controlling data file transfers from memory through a decoder to a user system or device.

SUMMARY OF THE INVENTION

A method and implementing apparatus is provided for transferring data from memory to a data file decoder which is effective to decode the file for further processing. The methodology includes enabling a plurality of control functions for access by a user or a user system in controlling the identity, sequence and flow of file transfers in order to optimize transfer efficiency in a data transfer transaction.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
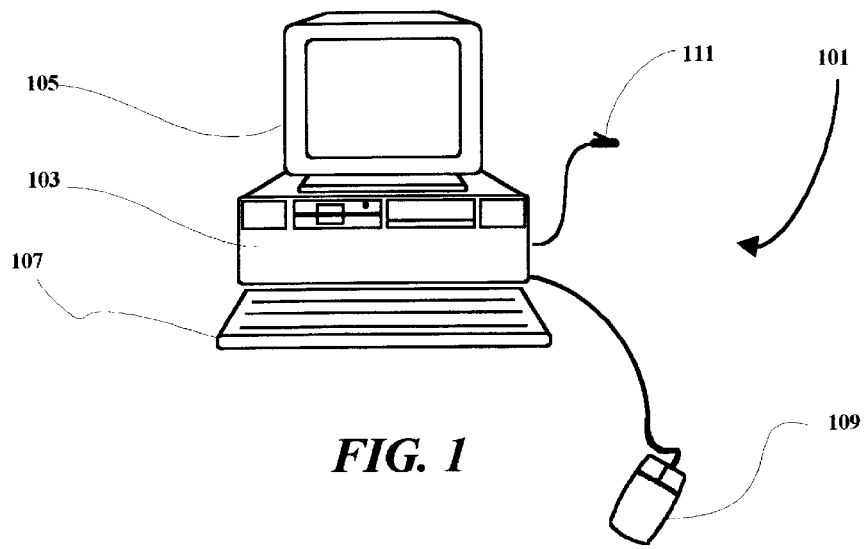
FIG. 1 is an illustration of an exemplary computer system terminal.

With reference to FIG. 1, the various methods discussed herein may be implemented within a typical computer system 101 which may include a workstation or personal computer. In general, an implementing computer system may be a single system or workstation, which may include a plurality of processors in a multi-bus system, or the disclosed methodology may be implemented in a network of similar systems. However, since the workstation or computer system or network within which the present invention may be implemented is, for the most part, generally known in the art and composed of electronic components and circuits which are also generally known to those skilled in the art, circuit details beyond those shown in FIG. 1 and FIG. 2 will not be explained to any greater extent than that considered necessary as illustrated, for the understanding and appreciation of the underlying concepts of the present invention and in order not to obfuscate or distract from the teachings of the present invention. The present invention may also be implemented on server-only systems which may not include a monitor unit, keyboard or mouse per se, but for purposes of explaining the present invention, a typical user terminal system including monitor, keyboard and mouse is illustrated. Further, it is noted that, although the present invention applies to and includes file transfers including video file transfers and audio file transfers, the present disclosure illustrates a video file application as exemplary.

In FIG. 1, the computer system includes a processor unit 103 which is typically arranged for housing a processor circuit along with other component devices and subsystems of the computer system 101. The computer system 101 also includes a monitor unit 105, a keyboard 107 and a mouse or pointing device 109, which are all interconnected with the computer system illustrated. Also shown is a connector 111 which is arranged for connecting a modem within the computer system to a communication line such as a telephone line in the present example. The terminal illustrated in FIG. 1 may also be arranged to be hard-wired within a network configuration. The present invention may also be implemented in a wireless or cellular system.

Figure 2:
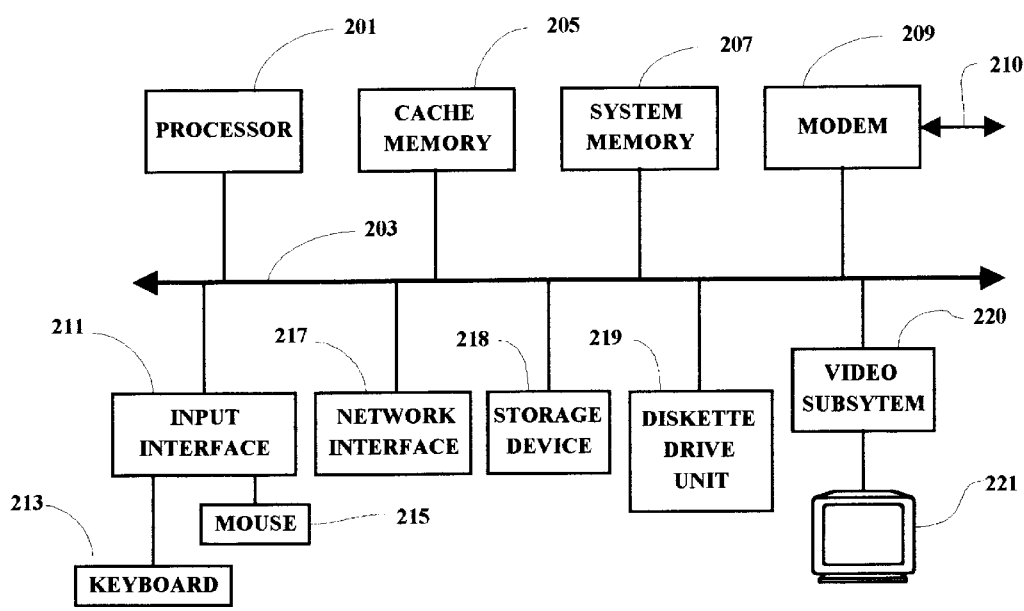
FIG. 2 is a simplified schematic diagram including several of the major components of the system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a network interface subsystem 217 and a diskette drive unit 219. A video subsystem 220, which may include a graphics subsystem, is connected to a display device 221. A storage device 218, which may comprise a hard drive unit, is also coupled to the bus 203. The diskette drive unit provides a means by which individual diskette programs may be loaded on to the hard drive, or accessed directly, for selective execution by the computer system 101. As is well known, program diskettes containing application programs represented by magnetic or other indicia on a disk or diskette, may be read from the diskette drive (or a CD drive), and the computer system is selectively operable to read such magnetic or other indicia and create program signals. In network configurations, application programs are typically stored in system memory and available for access by all terminals which may be connected within the computer system. Such program signals are selectively effective to cause the computer system terminals to present displays on the screen of a display device and respond to user inputs and in accordance with the functional flow of an application program.

In accordance with the present disclosure, video files which may be stored in any of the memory or storage systems illustrated, are accessed and transferred to a video file decoder, which may be implemented as part of the video subsystem 220, for example, and presented to a user on the display device 221. In the present example, a control program containing the application programming interface which enables the control functions herein described is provided in the form of program code which also may be stored in any of the storage or memory devices, or on diskettes or CDs, typical of computer systems in general. The functional features herein provided may also be implemented in dedicated hardware or firmware.

Figure 3:
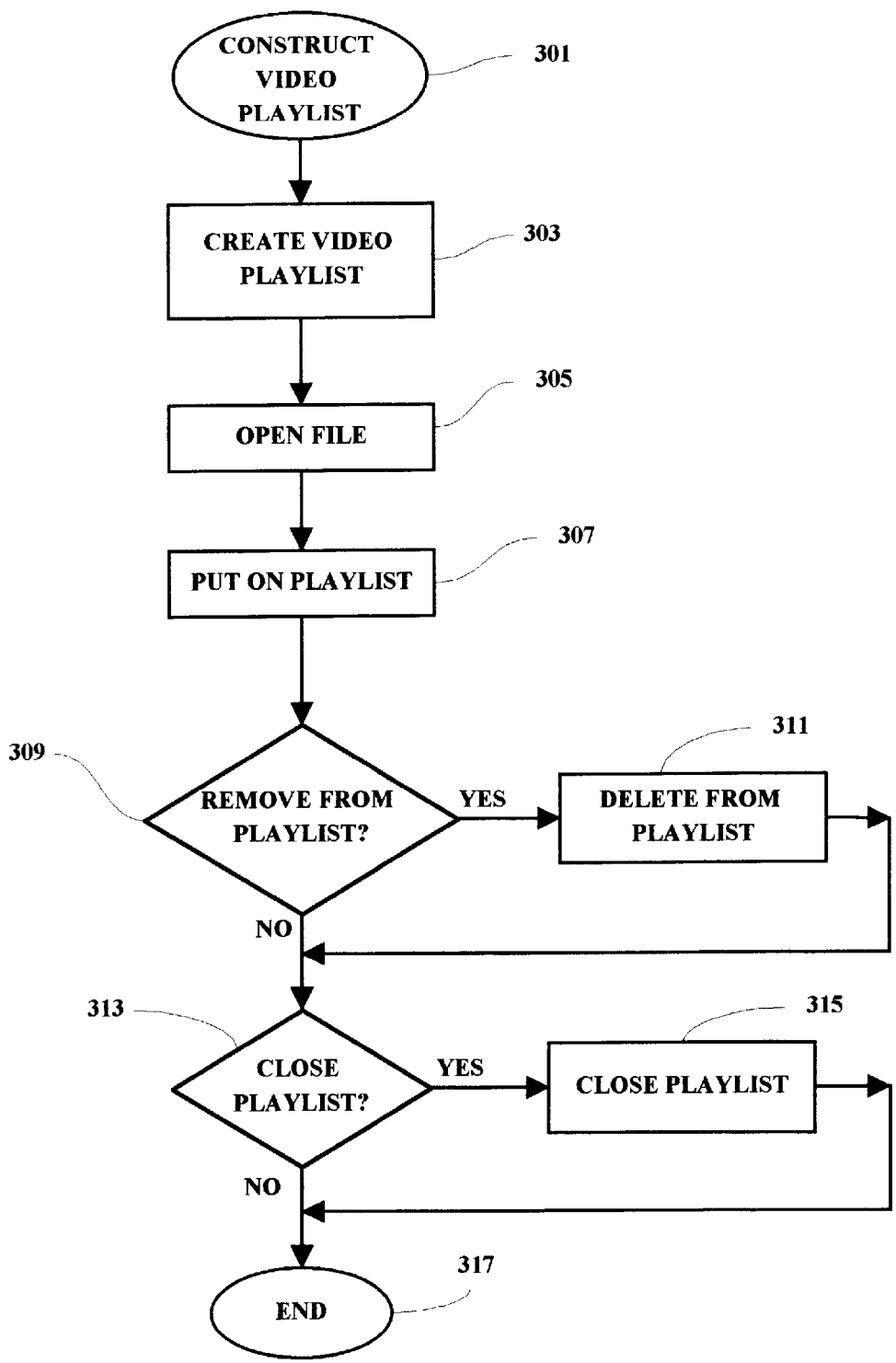
FIG. 3 is a flow chart illustrating one functional flow sequence for the construction of an exemplary video file playlist in accordance with the methodology of the present disclosure.

In accordance with one feature of the present disclosure, a playlist containing a sequence of video files to be transferred, in a predetermined order, from memory to a video file decoder, may be constructed utilizing several of the application programming interface (API) calls implemented in the control program. For example, as illustrated in FIG. 3, a user application may construct a video playlist 301 by invoking a CREATEPLAYLIST call 303. The CREATEPLAYLIST call includes a mode parameter and an address of playlist handle parameter. The mode parameter is an integer that is passed with the call. If the mode parameter is "0", then the files belonging to the list are possibly unrelated. They may be coded with different video coding standards and may be required to be transferred to the video file decoder at different speeds. If the mode parameter is "1", then the files in the playlist are related. They are all coded using the same standard and must be transferred to the video file decoder at the same speed. This function also passes the address of a memory location to store an integer. In that memory location, an integer ID called "playlist handle" is stored by the control program. That ID is subsequently used in other API function calls to identify the particular playlist to the control program.

In the present example, the program next invokes a OPENFILE call 305. The OPENFILE call includes the following parameters: address of file handle; file name; bit rate; and coding standard. The OPENFILE API function is called to open an existing file in order to transfer it. The file handle parameter is the address of an integer that is returned by the control program and is subsequently used by other API calls to identify the file. The file name parameter identifies the file to be transferred. The bit rate parameter is used to determine the rate at which the file is to be transferred. The coding standard parameter is used to indicate the digital coding standard (for example, MPEG1 or MPEG2) that has been used to encode the file to be transferred.

The next call that is invoked in the example is the PUTONPLAYLIST call 307. The PUTONPLAYLIST API function is used to insert a description of a video file that is to be transferred to a video file decoder. The PUTONPLAYLIST call includes the following parameters: playlist handle; file handle; entry; start offset; end offset; label; and go to label. The playlist handle identifies the playlist where the video file description will be inserted. The playlist must be previously created by the CREATEPLAYLIST API call 303. The file handle parameter identifies a video file previously opened by the OPENFILE( ) API function call. A description of this video file is inserted in the Playlist. The "entry" value is an integer that gives the position in the playlist where the video file information will be inserted. The "start offset" value is an integer that determines the location within the video file from where the control program starts transferring the contents of the file. The "end offset" is an integer that determines the location within the video file up to which the file contents are transferred. The "label" and "go to label" are integers that determine the order in which the entries of the playlist are transferred to the video file decoder. During the process of transferring files, after the video file specified by the current entry of the playlist is completely transferred, the control program looks for the entry the "label" value of which is identical to the "go to label" value of the current entry. That is the entry that specifies the video file to be transferred next. If the "go to" label is "0", the next entry in the playlist is the next video file to be transferred. The first file transferred is the file described by the first occupied entry in the playlist.

As shown in FIG. 3, if a file is to be removed from the playlist 309, a DELETEFROMPLAYLIST call is provided to accomplish that function. The parameters are: playlist handle; and entry. This API function is called to remove an entry, i.e. a file identified by the "entry" value, from a playlist which is identified by the playlist handle. The "entry" must be inserted previously in the playlist by the API function call "PUTONPLAYLIST". Removal of an entry from a playlist will stop the transfer of the video file, identified by the entry, to the video file decoder.

The call CLOSE(PLAYLIST HANDLE) CLOSE(FILE HANDLE) may be invoked by the control program when it is determined to close the playlist 313. When the CLOSE function is called, that API function will close the playlist or file identified by the "playlist handle" or "file handle"

parameter. All information about the playlist or file will be discarded, the computer memory area that was used to hold information about the playlist or file will be returned to the computer operating system and the program segment will end 317. The operational flow sequence of FIG. 3 is only an example flow to illustrate several of the functional features of the video data transfer control program disclosed herein. Not all of the illustrated functions need to be called, and any that are called need not be executed in any predetermined sequence (except as otherwise expressly and specifically noted) in order to practice the present invention. Similarly FIG. 4, FIG. 5 and FIG. 6 also show exemplary flow sequences in order to illustrate other functional features of the video file transfer control program herein disclosed.

Figure 4:
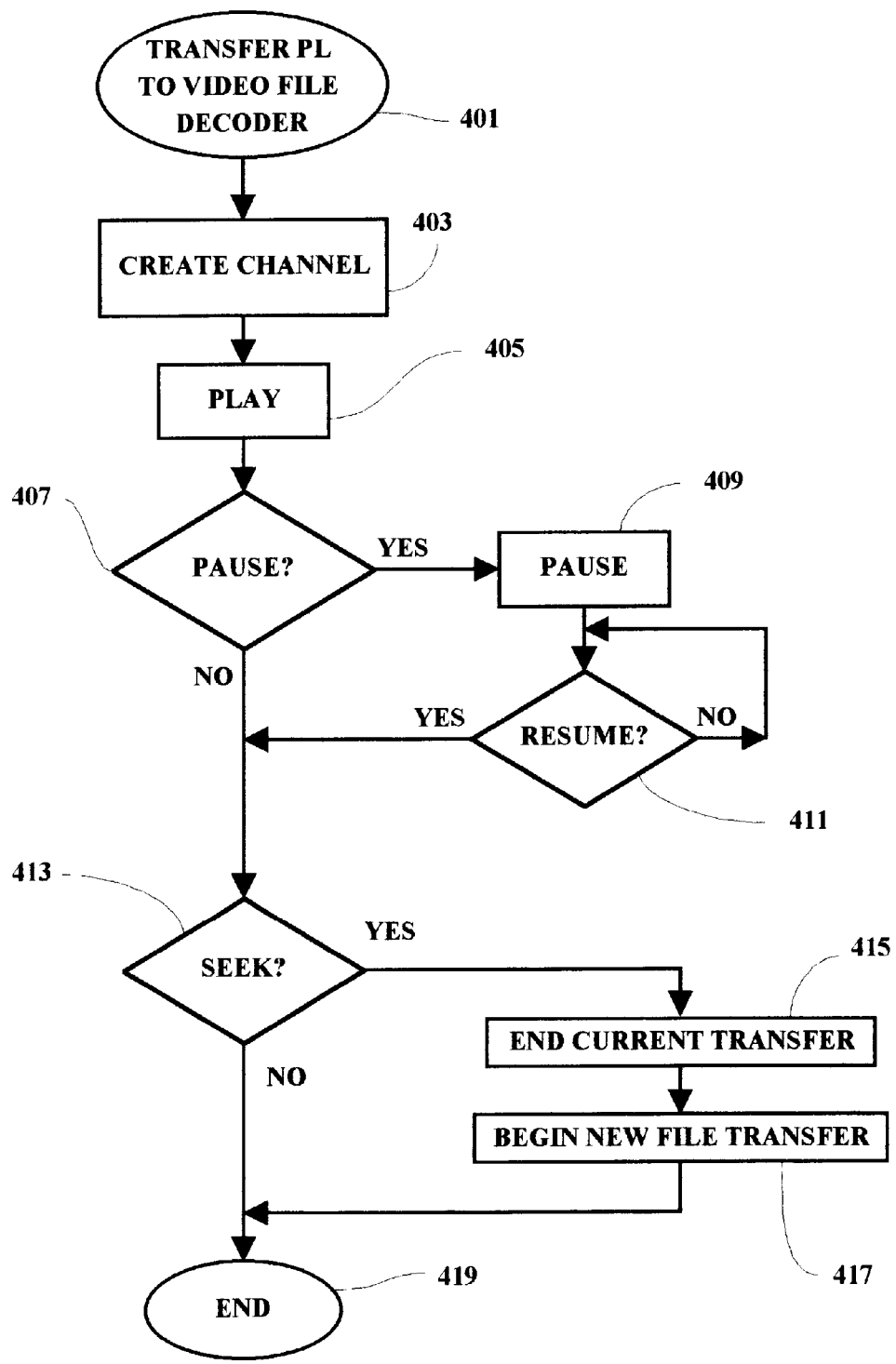
FIG. 4 is a flow chart illustrating a functional flow sequence for the implementation of several of the user options for an exemplary video file transfer in accordance with the methodology of the present disclosure.

In FIG. 4, an example is illustrated where the video files identified in a playlist can be transferred 401 to a video file decoder, and pause and jump functions can be invoked with the following API calls. A CREATECHANNEL API function call 403 may be invoked to associate a playlist with a video file decoder and to create a channel that is an aggregate of computer variables that represent the state of the association and its constituents. The parameters of CREATECHANNEL include: playlist handle; video file decoder identifier; and address of channel handle. The "playlist handle" is used to identify a playlist that was previously created by making an API function call CREATEPLAYLIST and was populated with video file entry descriptions by making API function calls PUTONPLAYLIST. The "video file decoder identifier" identifies a video file decoder that can show on its screen a video whose contents are coded by the video files described by the entries in the playlist. The video file decoder can be accessed by the computer on which the control program is running. If the video file decoder is part of another computer, then it is accessed across a computer network using standard methods, for example, the internet protocol. If the video file decoder is attached to the computer on which the control program is running, then the video file is transferred to the decoder using standard methods implemented to transfer data between devices connected to the same computer. An integer channel identifier is written by the control program in the memory location provided in the "address of channel handle" field. That channel handle is subsequently used to identify the channel created as a result of the API call.

After a channel is created 403, a PLAY function call 405 may be invoked. The PLAY call includes "channel handle" and "time" parameters. PLAY is called to initiate the transfer of video files in a channel. The video files to be transferred are the ones described in the playlist which is a constituent of the channel. The video files will be transferred to a video file decoder which is the other constituent of the channel. The time value indicates the time at which the transfer will begin. If the time value is past, then the transfer begins immediately. The video files are transferred in the order specified by the "label" and the "go to label" values in the playlist entries.

After a PLAY 405 has been called, a PAUSE call 407 may be invoked. The PAUSE API function includes: channel handle; entry; and pause offset parameters. The PAUSE function 409 is called to pause the transfer of a video file. The "channel handle" identifies the channel on which video file transfer has begun. The "entry" value indicates the video file entry at which the pause is executed. The entry value is given as "−1" if the pause is to be executed immediately. For a positive entry value, the pause is executed when the video file described by the playlist entry with the given entry number is being transferred. The pause is executed at the video file location specified by the "pause offset". To resume 411 from a pause 409, the PLAY API function call is made in the present example.

In FIG. 4, after the pause 409 has been resumed, a SEEK call 413 is illustrated. The SEEK call includes parameters "channel handle", "from entry", "from offset", "to entry" and "to offset". The SEEK API function is called to change the file being transferred, or to change the segment of the file being transferred on a channel. The channel handle identifies the channel which has a constituent playlist that contains the descriptions of the files to be transferred as the entries of the playlist. The "from entry" is an integer in the present example. If it is specified as "−1", then the SEEK is executed immediately. In that case the new file to be transferred is identified by the "to entry" value. The starting location for the file transfer is specified by the "to offset" value. The transfer of the current file immediately ends 415 and the transfer of the new file begins 417. If the "from entry" is specified as a positive integer, then the SEEK is executed when the file identified by "from entry" is being transferred. The time of switching from one file to another is identified by the "from offset". After the control program completes transferring the video file byte identified by the "from offset", it switches to transferring the other file specified in the call. The new file to be transferred is identified by the "to entry" value. The starting location of the file transfer is specified by the "to offset" value. After the new file transfer 417, the process illustrated in FIG. 4 ends 419.

A channel can be closed by a CLOSE(CHANNEL) API call. This will cancel the association between a playlist and a video file decoder.

Figure 5:
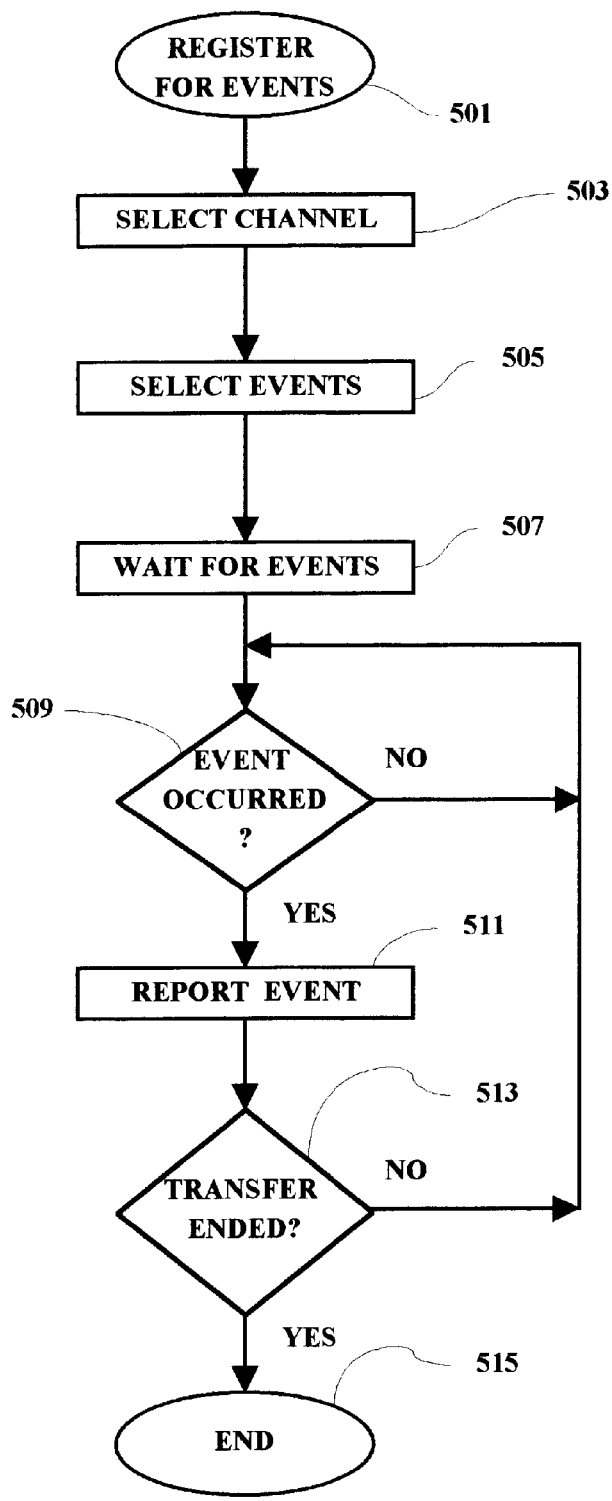
FIG. 5 is a flow chart illustrating a functional flow sequence for an event registration process.

The control program disclosed herein also provides a mechanism to report to the user the occurrence of several events such as the beginning of the transfer of a file, the end of the transfer of a file, the execution of a "pause" on the transfer of a file, the execution of a "seek" on the transfer of a file, and so on. To implement the registration of events function, API calls REGISTERFOREVENTS(channel handle, event mask) and WAITFOREVENTS(Channel handle) have been provided. As shown in FIG. 5, in the REGISTERFOREVENTS call 501, the channel handle identifies the channel which the user has selected 503 and wants one or more events, as may be selected 505, to be reported. The "event mask" is an integer that is a combination of several integer values in the present example, which indicate the events that should be reported to the user. Examples of such events include: "Start of Entry", i.e. the beginning of a transfer of an entry in a playlist; "End of Entry", i.e. the end of a transfer of an entry in a playlist; "Pause Event", i.e. the execution of a PAUSE on a file transfer; "Seek Event", i.e. the execution of a SEEK on a file transfer; "Server Read Error", i.e. an error has been encountered in reading a file to be transferred; and "Server Write Error", i.e. an error has been encountered in sending a file to a video file decoder. The WAITFOREVENTS API function is called 507 to wait for the reporting of an event described above. As the selected events occur 509, they are reported 511. This process will continue until a transfer has ended 513 at which time the event registration process is also ended 515.

Figure 6:
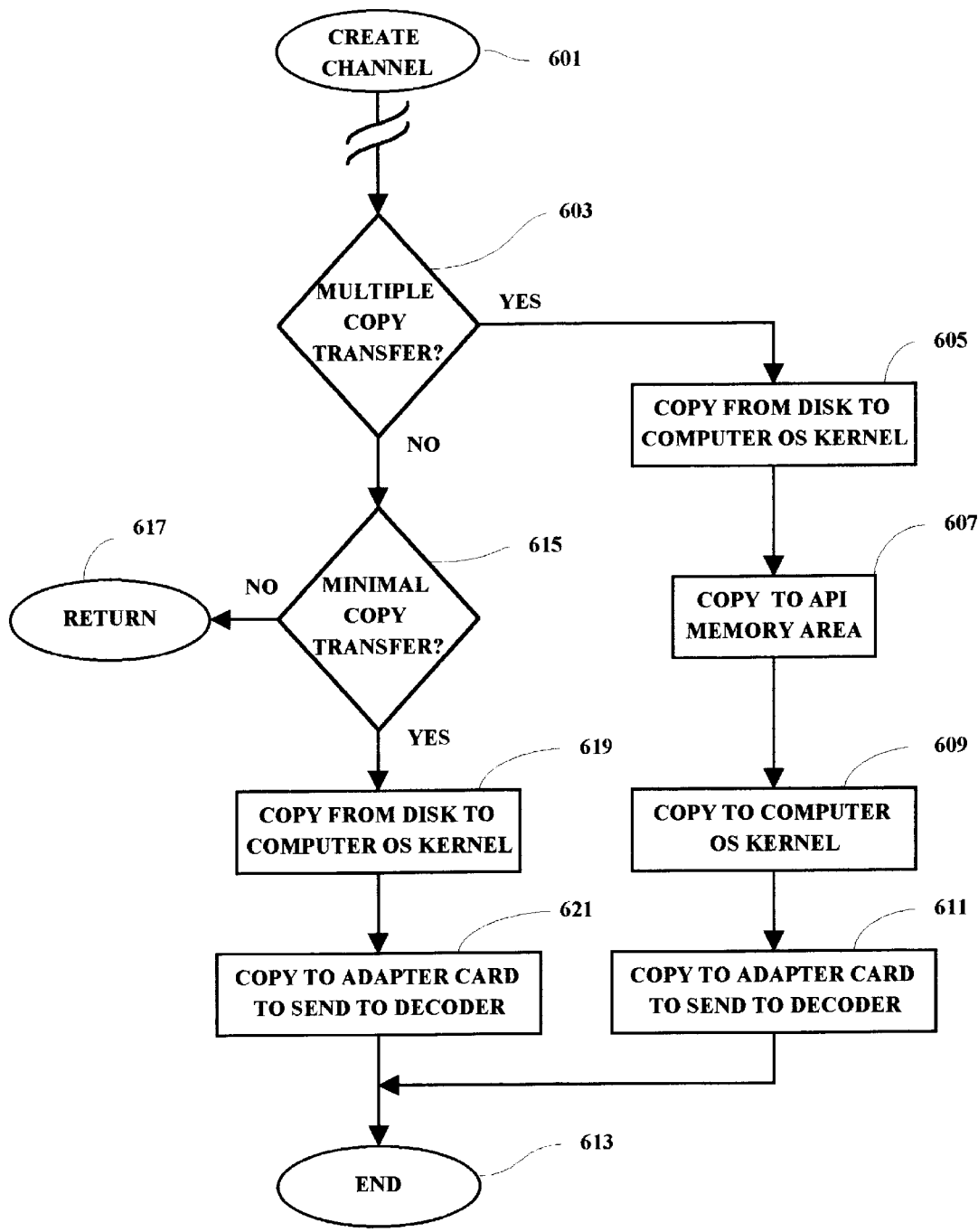
FIG. 6 is a flow chart illustrating a data transfer mechanism select function as implemented in the exemplary embodiment.

As illustrated in FIG. 6, during a CREATECHANNEL API call 601, it is determined by the control program what type of transfer mechanism will be used based on the type of file connection to be used to the video file decoder. An indicator variable is stored and indicative of the transfer mechanism. The indicator variable is used later when PLAY, PAUSE and SEEK API functions are called to determine what software routines will be called to execute a PLAY or a PAUSE or a SEEK API call depending upon the type of channel that is being used. The present example illustrates two types of transfer mechanisms, i.e. multiple copy transfer and minimal copy transfer. If a multiple copy transfer mechanism 603 is used, video files are transferred using a number of copies: from a disk to a memory area belonging to the computer operating system kernel 605; then to a memory area belonging to the control program or Application Program Interface program 607; then to a memory area belonging to the computer operating system kernel 609; and then to an adapter card for sending to the video file decoder 611, after which, the transfer to the decoder ends 613. If the system is using a minimal copy transfer 615 (which may be implemented through a file coupling data transfer methodology), then data blocks are copied from disks to a memory area belonging to the computer operating system kernel 619, and the data blocks are transferred to an adapter card for sending to a video file decoder 621 after which the transfer to the decoder ends 613. If neither a multiple copy transfer mechanism nor a minimal copy transfer mechanism is used, then the process returns 617 for error processing.

The advantages of the multiple copy transfer method are: standard software programming libraries may be used; no new operating system kernel is required; and it can be used to transfer to a video file decoder connected using any existing networking device that supports the internet protocol. Thus the multiple copy transfer method works for a large variety of networking devices and porting the control program to different operating systems is simpler. The minimal copy transfer method is implemented with an additional software extension to the operating system and provides increased speed and efficiency in transferring data blocks to a video file decoder.

In the present example, the PLAY, PAUSE and SEEK functions are implemented differently according to the type of data transfer mechanism being used. If the multiple copy transfer mechanism is used, standard operating system function calls may be used to transfer a video file. The functions are implemented completely in the user space (memory area belonging to the control program) by utilizing socket function calls for network input/output, standard file system function calls for file input/output, and standard thread mechanism for playlist and input/output processing.

The minimal copy transfer mechanism uses minimal copy transfer software that extends the computer operating system kernel. That software provides a number of API function calls which are known as "IOCTL( )" calls. The following IOCTL calls are used to transfer video files described in a playlist and execute PAUSE and SEEK mechanisms.

An IOCTL(CTL_START, FILE INFORMATION) call is used to specify the first video file. The first file is specified using the "file information" value. The minimal copy transfer software will transfer the contents of the file from a disk to an adapter card so that the contents can be transferred to the video file decoder. However for the transfer to be initiated, an IOCTL call with CTL_RESUME as specified below, has to be made.

An IOCTL(CTL_QUEUE, FILE INFORMATION) call is used to specify a video file that is to be transferred at the completion of the current video file transfer. "File information" is used to specify the file that is to be transferred at the completion of the current file transfer. During the transfer of the current video file, the next video file is known as the "queued video file".

An IOCTL(CTL_PAUSE, PAUSE INFORMATION) call is used to specify a position at which the minimal copy transfer software will temporarily stop file transfer. The "pause information" may specify that the file transfer be immediately stopped at the current file position, or it may specify that the file transfer be stopped and the position for resuming the file transfer be marked as any other position of the current file or the queued video file. When the pause is done, the minimal copy transfer software notifies the control program.

An IOCTL(CTL_RESUME) call is used to resume from a paused state. Also it is used when the minimal copy software makes a file transfer transition from the current video file to the queued file. When the transfer of the current video file completes, the minimal copy software notifies the control program. The control program then calls IOCTL (CTL RESUME) in order to start transfer of the queued video file. To start the transfer of a video file specified with a CTL_START, an IOCTL call with CTL_RESUME is called. The above IOCTL calls can be used to transfer a set of video files specified with a playlist to a video file decoder. The above calls can be used to execute SEEK and PAUSE functions.

The control program is implemented in the following manner. The control program has two types of components. The first type of component is called the command processor. The second type of component is called the file exporter. These two types of components work concurrently. There is only one command processor but there are as many file exporters as there are channels. The command processor receives the API function calls such as PLAY and PAUSE. The file exporter is responsible for reading data from the video files in the playlist and transferring them to the video file decoder of the channel. The behavior of the file exporter depends on whether a minimum copy or a multiple copy transfer method is used.

The command processor waits for API calls. As an API call is made, the command processor executes several actions. The command processor interacts with all of the file exporters so that user commands from API calls can be properly carried out by the file exporters. The command processor creates and destroys file exporters as and when necessary.

The command processor constructs and maintains a list for each playlist created by a user through CREATEPLAYLIST and populated by PUTONPLAYLIST and DELETEFROMPLAYLIST. The list maintained by the command processor contains a list of files to be transferred to a video file decoder. The exact sequence in which the files are to be transferred is given in the list.

When a CREATECHANNEL API call is made, the command processor associates the playlist identified by the CREATECHANNEL with the video file decoder identified by the CREATECHANNEL. It creates a file exporter that will transfer the files specified in the playlist to the video file decoder. The file exporter stands ready to transfer, but does not begin until the PLAY API call on the channel is made.

In the minimal copy transfer method, the file exporter makes an ioctl(CTL_START, FILE_INFORMATION) call to the minimal copy software to give information about the first file to be transferred. The minimal copy software reads a small portion of the first file so that it can immediately begin to transfer after the PLAY API is called. The file exporter makes an ioctl(CTL_QUEUE, FILE_INFORMATION) call to the minimal copy software to give information about the next file in the playlist to be transferred. The minimal copy software will start reading the next file immediately after the completion of reading of the first file. The file exporter then waits for a notification from the minimal copy transfer software regarding when it has paused or completed reading a file.

In the multiple copy transfer method, two computer variables called "current playlist entry" and "current offset" are maintained. The current playlist entry indicates the current file being transferred, and the current offset indicates the offset within the file being transferred. The file exporter initializes the current playlist entry to the first file of a playlist. The current offset is initialized to the "start offset" value in the playlist file description.

When the PLAY API call is made on a channel, the command processor gets the corresponding file transfer started. The channel handle in the call is used to identify the file transfer to be started.

In the minimal copy transfer method, the command processor makes an ioctl(CTL_RESUME) call to the minimal copy transfer software. The minimal copy transfer software proceeds with reading the file and writing it to the video file decoder. This is continued until a PAUSE API is called or until the file is completely read. When the file is completely read, the minimal copy transfer software notifies the file exporter. At that time, the minimal copy transfer software already has another file queued to it. It also reads a small part of it so that the part can be transferred without any delay. The file exporter queues the next file in the playlist to the minimal copy software with an ioctl(CTL_QUEUE, FILE_INFORMATION) call. An ioctl(CONTROL RESUME) call is then made to get the minimal copy software started again. The file previously queued to the minimal copy software becomes its current file. The file just queued becomes the queued file. The file exporter waits for notification of completion of the transfer of the current file by the minimal copy transfer software. That sequence is repeated for all of the files in the playlist if no PAUSE or SEEK API calls are made before all of the files in the playlist are transferred. Since the minimal copy transfer software is written as an extension of the computer operating system kernel, it has a simple operational logic to contain its complexity. The complex logic of processing a playlist is handled by the file exporter. It makes use of the capabilities of the minimal copy transfer software by making the ioctl( ) calls. After all of the files in the playlist have been transferred, the file exporter waits until the CLOSE(CHANNEL) API call is made. When the CLOSE(CHANNEL) is called, the command processor destroys the file exporter and cancels the association between the playlist and the video file decoder.

In the multiple copy transfer method for PLAY API, the command processor gets the file exporter started by sending a signal to the file exporter. The file exporter reads data from the input side of a channel (a file on a disk) and write it on the output side of the channel (a video file decoder). The reading and writing are done in parallel. Enough data is read in advance to preclude the output side from having to wait for data. The location to read from is determined by the contents of the "current playlist entry" and the "current offsets". During the transfer of a file, video file data is temporarily held in memory buffers which are, for example, sized at 32×1024 or 256×1024 bytes. The size depends on the video file transfer rate. If the video file is transferred at a bit rate less than or equal to one million bits per second, then memory buffers of a size 32×1024, for example, are used. For video file transfer rate higher than one million bits per second, memory buffers are sized at 256×1024 bytes, for example. The number of buffers used is configurable by the user of the control program. To maximize video file transfer performance, reading of a file and writing to a video file decoder may be conducted in parallel.

When the PAUSE API is called, the command processor identifies the file transfer to be paused by the channel handle. In the case of minimal copy transfer, if the pause location is in the file currently being transferred by the minimal copy transfer software or in the file queued to the minimal copy transfer software, then the command processor pauses the file transfer by making the ioctl(CTL_PAUSE, PAUSE_INFORMATION) call to the minimal copy transfer software.

The minimal copy transfer software is capable of pausing only in the current file or in the queued file. So if the pause information indicates that the pause is in a file other than the current file or queued file, then the command processor makes a copy of t he pause information. Later when the file exporter queues this file to the minimal copy transfer software, it looks up the pause information and makes an ioctl(CTL_PAUSE, PAUSE_INFORMATION) call to the minimal copy transfer software.

The minimal copy transfer software notifies the file exporter when it actually pauses the file transfer. The timing of the actual pause depends on the PAUSE_INFORMATION in the PAUSE API call. When the file exporter is notified, it will report a "Pause Event" to the user.

In the multiple copy transfer method, when the command processor receives the PAUSE API call, it makes a copy of the call, and, in addition, it sets an integer variable called "pause_flag" to "1" to indicate that the file transfer needs to pause. Before PAUSE API call is made, the pauses_flag has a value of "0". After the file exporter resumes playing after a pause, the pause_flag is again set to zero. Every time the file exporter writes to the video file decoder, it check the pause_flag to determine if it needs to pause. When it needs to pause, the file exporter temporarily suspends the transfer of the video file until t he PLAY API is call ed to resume the transfer. If the "entry" and "offset" values in the PAUSE_INFORMATION has not yet been reached, the transfer is continued until the "entry" and "offset" values are reached. Enough data is read in advance to preclude the write side from having to wait for data. When the file exporter pauses, it will report a "Pause Event" to the user.

A paused file transfer is resumed by a PLAY API call. In the minimal copy transfer method, the command processor makes the ioctl(CTL_RESUME) call to the minimal copy transfer software to get the file transfer resumed. In the multiple copy transfer method, a signal is sent to the file exporter to have it resume file transfer.

When the SEEK API is called, the command processor identifies the file exporter that should execute the seek by the channel handle.

In the minimal copy transfer method, if the seek is in the file currently being transferred or in the file queued to the minimal copy transfer software to be transferred next, the command processor makes an ioctl(CTL_PAUSE, PAUSE_INFORMATION) call for a pause at the location specified by the "from entry" and "from offset" parameters in the SEEK API call. This makes the minimal copy transfer software to transfer until the "from entry" and "from offset" are reached. The ioctl(CTL_PAUSE) call also specifies in the PAUSE_INFORMATION the location at which the minimal copy software should resume. That location is based on the "to entry" and "to offset" values in the SEEK API call. The minimal copy transfer software notifies the file exporter when it pauses. The file exporter makes an ioctl (CTL_RESUME) call to the minimal copy software to have it resume at the location given in the SEEK API call "to entry" and "to offset" parameters. Thus, the ioctl(CTL_

PAUSE, PAUSE_INFORMATION) is used to execute both pause and seek.

If a seek is in a file other than the current file or the queued file, then the command processor makes an ioctl(CTL_QUEUE, FILE_INFORMATION) call to the minimal copy transfer software. This makes the minimal copy transfer software discard the queued file information which it had from the previous ioctl(CTL_QUEUE, FILE INFORMATION) call, and updates its queued file information with the file information given in the recent ioctl(CTL_QUEUE, FILE_INFORMATION call. Then the command processor makes an ioctl(CTL_PAUSE, PAUSE_INFORMATION) call to immediately pause and prepare to resume at the location given in the file just queued to the minimal copy software. The minimal copy software pauses and then notifies the file exporter. The file exporter makes an ioctl(CTL_RESUME) call to the minimal copy software to have it resume at the location given in the SEEK API call.

In the multiple copy transfer method, when the SEEK API is called, the new location to jump to is computed and "current playlist entry" and "current offset" are updated appropriately. If the "from entry" and the "from offset" have not been reached, reading and writing are continued until "from entry" and "from offset" are reached. Any buffered data beyond "from offset" is discarded. The new location is either in the same or a different file in the playlist. Enough data is read in advance to preclude the output side from having to wait for data.

The method and apparatus of the present invention has been described in connection with a preferred embodiment as disclosed herein, and provides predetermined data transfer control services in a video file transfer subsystem. The subsystem makes these services available at the application programming level for access by user application programs. Although an embodiment of the present invention has been shown and described in detail herein, along with certain variants thereof, many other varied embodiments that incorporate the teachings of the invention may be easily constructed by those skilled in the art, and also included or integrated into a processor or CPU or other larger system integrated circuit or chip. The methodology may also be implemented solely in program code stored in magnetic media, or other form, on a disk or diskette (portable or fixed), or other memory device including but not limited to CDs, which may be loaded into a system from which it may be executed to operate as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing data files in preparation for transferring at least portions of a series of data files from a first device to a second device, said method comprising:

providing a first process, said first process being selectively accessible for enabling a construction of a playlist, said playlist comprising a listing of said portions of said data files; and providing a second process, said second process being selectively accessible for enabling a closing said playlist upon a completion of said construction of said playlist, said first process being selectively operable for enabling a mode designation associated with said playlist, said mode designation being representative of speeds at which said portions are required to be transferred from said first device to said second device.

2. The method as set forth in claim 1 and further including:

providing a third process, said third process being selectively accessible for putting selected portions of data files in said playlist.

3. The method as set forth in claim 2 and further including:

providing a fourth process, said fourth process being selectively accessible for removing selected portions of data files from said playlist.

4. The method as set forth in claim 1 wherein said first process and said second process are software calls.

5. The method as set forth in claim 4 wherein said software calls are part of an application programming interface, said application programming interface being selectively accessible by a software application program.

6. The method as set forth in claim 1 wherein said first device is a memory unit and said second device is a file decoder unit.

7. The method as set forth in claim 6 wherein said file decoder unit is included within an enhancement circuit, said enhancement circuit being arranged for connection to a user device, said user device being arranged to selectively effect a presentation on said user device in response to an input from said enhancement circuit.

8. The method as set forth in claim 1 wherein said data files are video data files.

9. The method as set forth in claim 1 wherein said data files are audio data files.

10. A storage medium including machine readable indicia, said storage medium being selectively coupled to a reading device, said reading device being selectively coupled to processing circuitry within a processing system, said reading device being selectively operable to read said machine readable indicia and provide program signals representative thereof, said program signals being effective for processing data files in preparation for transferring at least portions of a series of data files from a first device to a second device, said program signals being effective to enable said processing system to accomplish the steps of:

constructing a playlist, said playlist comprising a listing of said portions of said data files; and enabling a closing said playlist upon a completion of said constructing of said playlist, said constructing being selectively operable for enabling a mode designation associated with said playlist, said mode designation being representative of speeds at which said portions are required to be transferred from said first device to said second device.

11. The medium as set forth in claim 10 wherein said program signals are further effective for:

selectively putting portions of said data files in said playlist.

12. The medium as set forth in claim 11 wherein said program signals are further effective for:

selectively removing portions of said data files from said playlist.

13. The medium as set forth in claim 10 wherein said first device is a memory unit and said second device is a file decoder unit.

14. The medium as set forth in claim 13 wherein said file decoder unit is included within an enhancement circuit, said enhancement circuit being arranged for connection to a user device, said user device being arranged to selectively effect a presentation on said user device in response to an input from said enhancement circuit.

* * * * *